Figure 21:
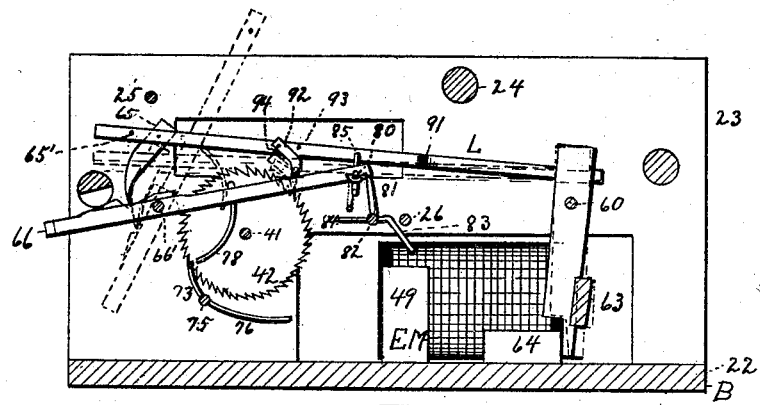

No. 795,836. PATENTED AUG. 1, 1905.
J. A. HULIT.
SELECTIVE CALL APPARATUS.
APPLICATION FILED SEPT. 3, 1904.
5 SHEETS—SHEET 1.
Fig. 1
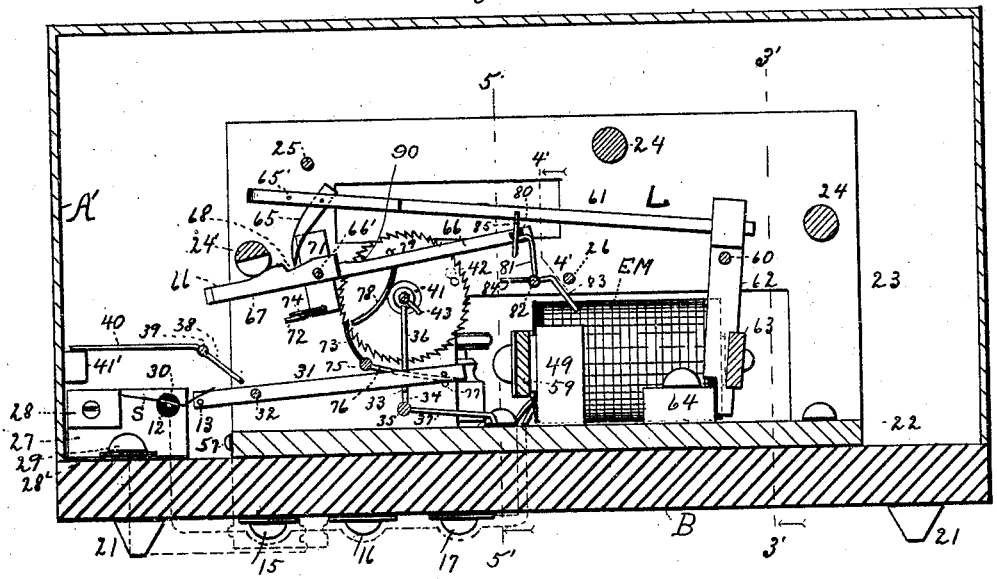
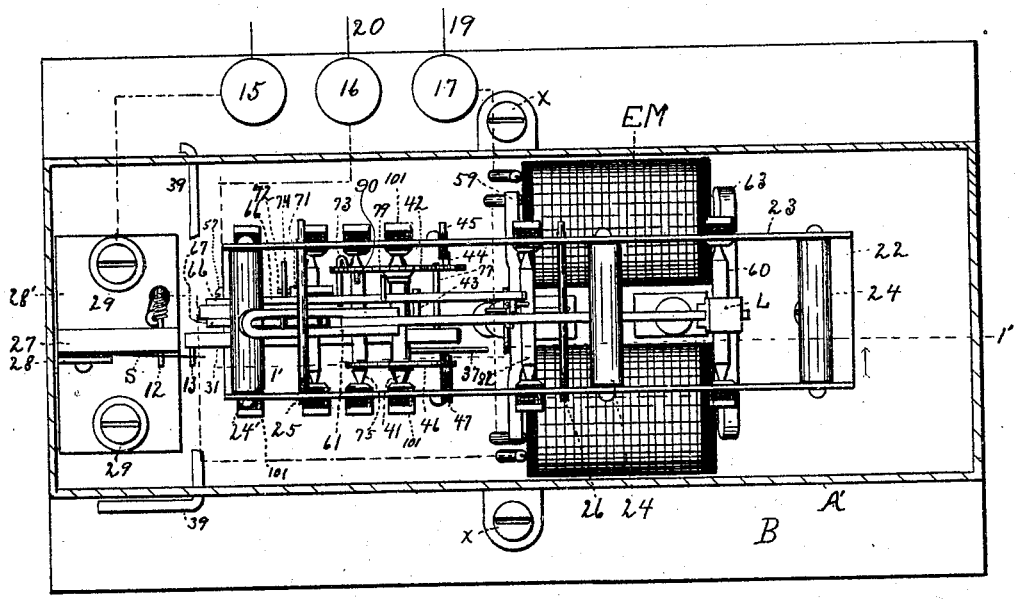
Fig. 2
Witnesses
E. T. Fisher
M. Rosen
Inventor
John A. Hulit
By J. A. Rosen
Atty No. 795,836. PATENTED AUG. 1, 1905.
J. A. HULIT.
SELECTIVE CALL APPARATUS.
APPLICATION FILED SEPT. 3, 1904.
5 SHEETS—SHEET 2.
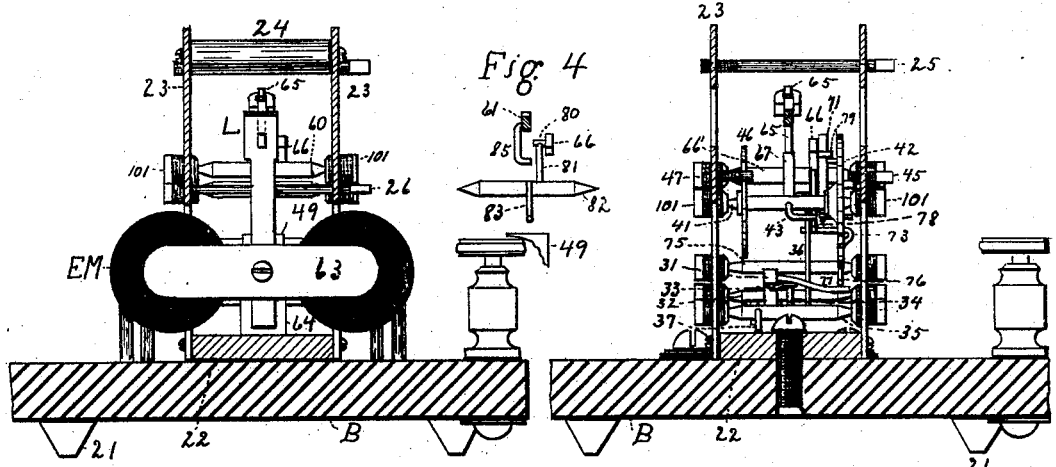
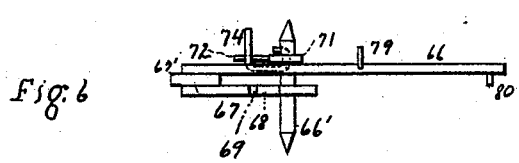
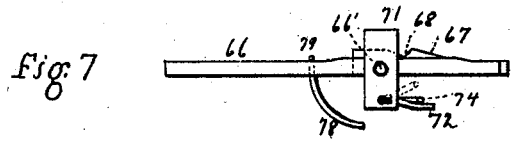
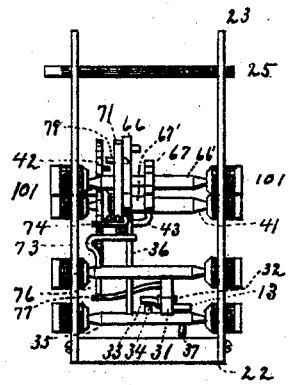
Witnesses
Inventor
John A. Hulit No. 795,836. PATENTED AUG. 1, 1905.
J. A. HULIT.
SELECTIVE CALL APPARATUS.
APPLICATION FILED SEPT. 3, 1904.
5 SHEETS—SHEET 3.
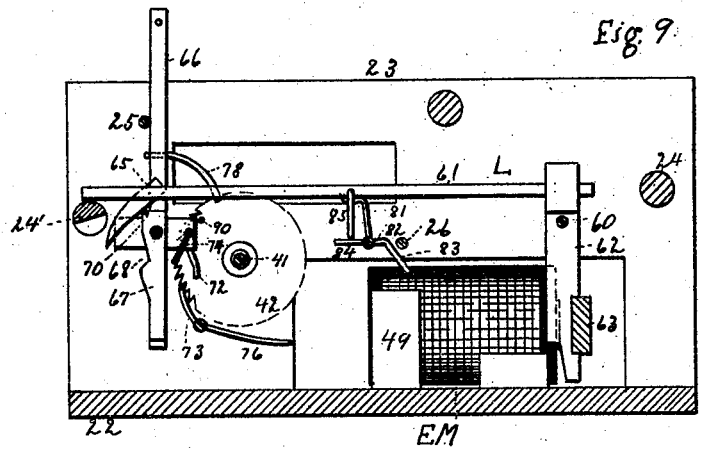
Fig. 9.
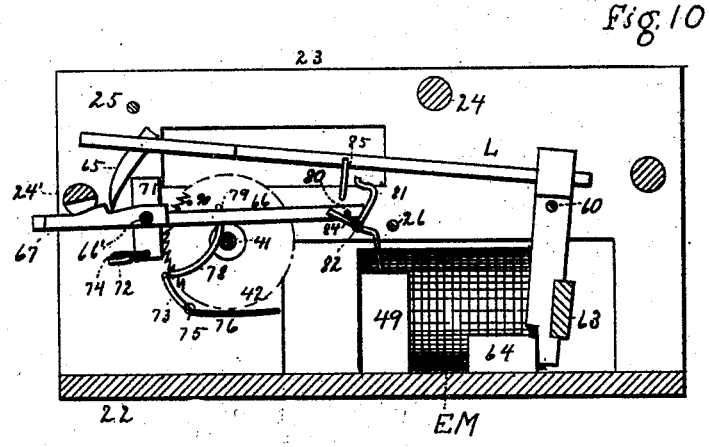
Fig. 10.
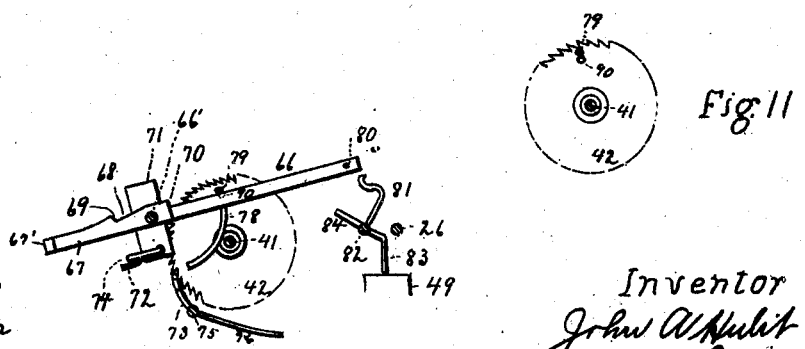
Fig. 11.
Fig. 12.
Witnesses
J. T. Fisher
Inventor
John A. Hulit
By J. A. Rosen
Atty No. 795,836. PATENTED AUG. 1, 1905.
J. A. HULIT.
SELECTIVE CALL APPARATUS.
APPLICATION FILED SEPT. 3, 1904.
5 SHEETS—SHEET 4.
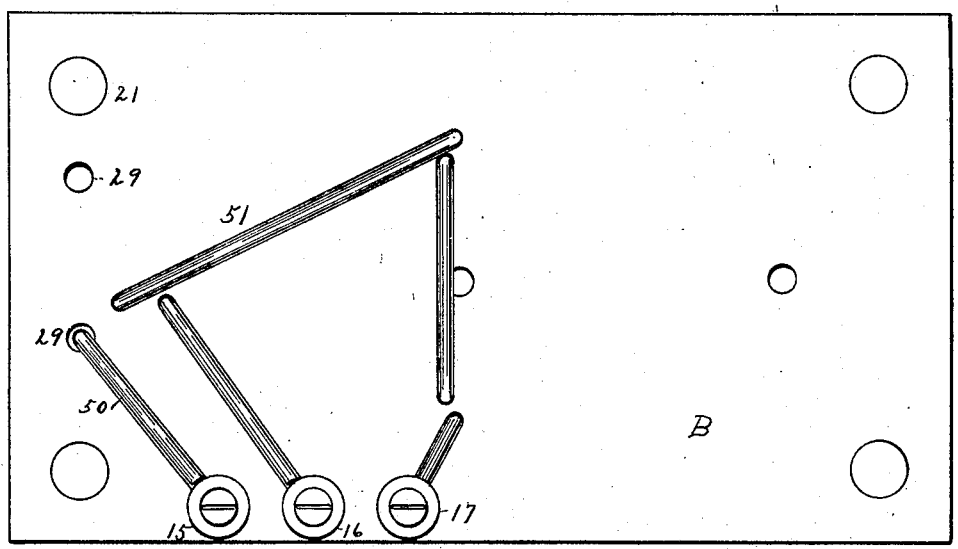
Fig. 13
Fig. 14   Fig. 15
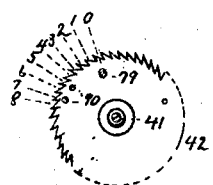   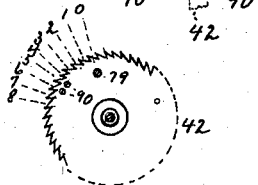   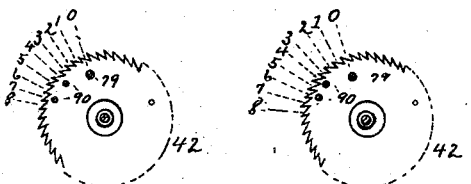
Fig. 16   Fig. 17   Fig. 18   Fig. 19
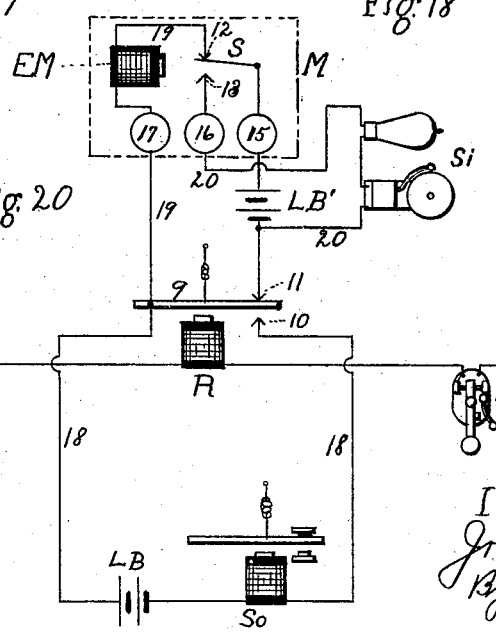
Fig. 20
Witnesses
F. T. Fisher
E. J. Rosen
Inventor
John A. Hulit
By J. A. Rosen
Atty No. 795,836. PATENTED AUG. 1, 1905.
J. A. HULIT.
SELECTIVE CALL APPARATUS.
APPLICATION FILED SEPT. 3, 1904.

5 SHEETS—SHEET 5.

Witnesses

Inventor
John A. Hulit

UNITED STATES PATENT OFFICE.

JOHN A. HULIT, OF TOPEKA, KANSAS.

SELECTIVE CALL APPARATUS.

No. 795,836. Specification of Letters Patent. Patented Aug. 1, 1905.

Application filed September 3, 1904. Serial No. 223,237.

*To all whom it may concern:*

Be it known that I, JOHN A. HULIT, a citizen of the United States of America, residing at Topeka, in the county of Shawnee and State of Kansas, have invented new and useful Improvements in Selective Call Apparatus, of which the following is a specification.

The invention relates to devices whereby any one or group of stations may be called or signaled without calling or signaling the other stations on the same circuit, useful on telegraph-lines, party-line telephone systems, and elsewhere. Such devices are usually operable by combinations of short and long electrical impulses, dots, and dashes on the main line, each station or group of stations being responsive only to a certain predetermined combination. As now constructed and used no provision is made whereby a given station may be called either individually or simultaneously with other stations at the will of the calling operator, but each station must be called separately or with the group in which it is placed, even though it be desired to call it with some other group or with only part of the group in which it is placed, or being included in a group no provision is made for calling it alone. It has been found unsatisfactory to place these devices on the main telegraph-line on account of their liability to get out of order, especially from lightning, and thus not only destroy their own usefulness, but also impair the entire circuit; but satisfaction has been attained in this regard by including the instrument on a local circuit controlled by the relay in the main line. Preference is for connecting the local machine-circuit with the ordinary relay which controls the local sounder-circuit and controlling the machine-circuit by the back contact of the relay, leaving the front contact to control the sounder-circuit in the usual manner. The dots and dashes by which the machine is operated are measured when the machine is included directly in the main line by the length of time that the circuit remains closed—that is, to start a signal the main line is normally open and a dot is made by closing the circuit only momentarily and a dash is made by keeping the circuit closed for a longer period of time, just as the dots and dashes are measured in transmitting by the Morse method; but when the machine is placed on a local circuit controlled by the back contact of the relay, as above explained, the manner of measuring the dots and dashes is reversed, for when the main-line circuit is open the local machine-circuit is closed and when the main-line circuit is closed the local machine-circuit is open. In other words, the dots and dashes must be measured by the length of time that the main-line circuit is open—that is, to start a signal to operate the machine the main line must be normally closed, and then a dot is made by opening the main line momentarily and a dash is made by keeping the main line open for some longer period of time, in which case the dots and dashes which operate the machine are short and long spaces of the Morse system. Although, of course, both front and back or down and up strokes must be made on the key in either method of measurement, yet for convenience in reference I refer to the first-described or ordinary method as dots and dashes produced by the direct stroke or action of the telegraph transmitting-key and to the latter method as dots and dashes produced by the back stroke or back action of the key.

Objects of my invention are to improve generally upon machines of this general nature and upon several of the parts thereof; to reduce the number of parts; to reduce friction; to simplify the mechanism; to avoid as far as possible the use of springs; to provide a machine of this nature which may be controlled by the back contact of the relay and yet be responsive to the dots and dashes produced by the direct stroke or action of the key as distinguished from the back stroke or action thereof; to provide mechanism in such a machine and so controlled, by which the ratchet may be progressed upon the closing of the telegraph-key; to provide a ratchet in such a machine with mechanism whereby a long stroke will progress all the ratchets on a line and whereby a short stroke will return same to normal position and not affect others; to provide such a device which may be operated by a weak current, comparatively; to provide a device of this nature that a series may be placed on a single line and that they may be called either singly or in groups at the will of the calling operator; to provide an automatic throw-off operable by the short stroke without progressing the ratchets; to provide other features in such a machine as hereinafter explained and claimed.

The invention consists of the parts, improvements, and combinations particularly pointed out and claimed herein.

In the drawings accompanying and forming part of this specification and in the description thereof I illustrate the invention in its preferred form and show the best mode of applying the principles thereof; but it is to be understood that the invention itself is not confined to the drawings and the description of the drawings, that it may be applied to other uses, and that parts and combinations thereof as specifically claimed may be used in connection with other devices of similar general nature, and that I contemplate changes in form, proportion, material, arrangement, and the substitution of equivalent members without departing from the spirit of the invention.

In the drawings I have shown the invention as applied to a telegraph-line, the machine proper being controlled by the back contact of the relay-armature.

Figure 22:
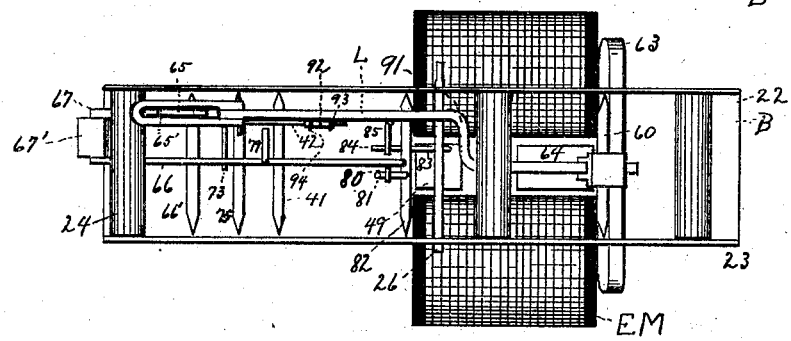
Figure 23:
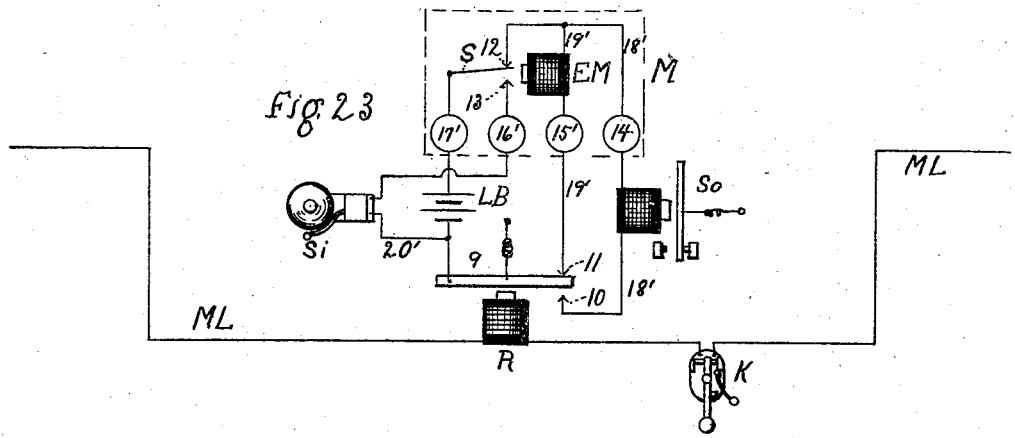

In Figures 1, 2, 3, 4, 5, and 8 the main operating parts of the machine are shown in normal positions, the telegraph-circuit being open and the local machine-circuit being closed. Fig. 1 is a vertical longitudinal sectional view of the machine proper, showing in side elevation the chief working parts of the machine, except the light coil-spring which returns the ratchet to normal position. This view is taken approximately on the line 1' 1', Fig. 2. Fig. 2 is a plan view thereof. The inclosing box is shown in section in Figs. 1 and 2. Fig. 3 is a cross-section through the line 3' 3', Fig. 1, none of the parts to the left of the line 5' 5' being shown, except that the main lever is shown in full. Fig. 4 is a companion view to and on the same elevation with Fig. 3, being taken on the line 4' 4', Fig. 1, and intended to show the tripping device which is concealed from view in Fig. 3. Fig. 5 is a cross-section taken along the line 5' 5', Fig. 1. Fig. 6 is a detail top view of the detached balance-bar and its shaft, and Fig. 7 is a side view thereof. Fig. 8 is an end view of the machine within the main frame and is intended specially to show the balance-bar and the arrangement of the parts from the ratchet-wheel to the switch-operating lever, certain parts being removed or broken away. Figs. 9, 10, 11, and 12 are intended to show the lever action and the automatic throw-off for restoring the ratchet to normal position. Fig. 9 shows the main lever in extreme low position and the balance-bar in extreme high position, as when the main line has been closed and the machine-circuit opened. Fig. 10 shows the main lever in extreme high or normal position and the balance-bar in extreme low position, which is assumed when the trip or short character or dot has been sent to return the ratchet to normal position. Fig. 12 represents the positions assumed by the levers and tripping device after the same signal or character has been given, as in the case of Fig. 10, except that in this figure the ratchet has been progressed far enough to bring a holding-pin under the balance-bar to prevent it from going to extreme low position and throwing off the holding-pawl. Fig. 11 is a side view of the ratchet, the pin therein, and a sectional view of the pin in the balance-bar sustained thereon, all in the same positions as in Fig. 12, and is intended to show the relative positions of these parts, such view being concealed in Fig. 12. Fig. 13 is a bottom view of the base with the wiring. Figs. 14 and 15 are respectively enlarged detail end and side views of the pin in the ratchet-wheel. Figs. 16, 17, 18, and 19 show the ratchet-wheels for four different stations with the pins selectively arranged therein and a sectional view of the pin which sustains the balance-bar, it being understood that the individuality is predetermined by the arrangement of these pins in the ratchet-wheel. Fig. 20 represents in diagram the preferred manner of the wiring and connections at a station equipped with my call apparatus. In Figs. 21 and 22 I show another manner of applying the principles of the invention, the only substantial change being to pivot the propelling-pawl directly on the main lever instead of on the balance-bar, as in the preceding figures. Fig. 21 is a side elevation of the main features involved in the change; and Fig. 22 is a plan view, other parts not being shown. Fig. 23 is a diagram of another manner of the local wiring, the change being that here I use a single battery for the sounder, machine, and calling-circuits, while in the preceding diagram I show a battery for the local sounder-circuit and another battery for the machine and calling circuits.

Like letters and numerals of reference indicate like or corresponding parts throughout the several views.

Reference will first be made to the figures illustrating in diagram the local wiring.

In Fig. 20, ML represents the main-line wire of the telegraph-circuit passing through a station, the remaining portions of the figure representing the wiring and apparatus at that station. R is the relay, 9 the armature, and 10 and 11 the front and back contacts, respectively. 18 18 represent the local sounder-circuit, controlled by the front contact of the relay in the usual manner, and in which are included the local battery LB and the sounder So or other receiving instrument. K is the usual key. Si represents any suitable local calling, signaling, or annunciating device, such as a light or a bell, or both. LB' is a second local battery, and M (shown in the dotted outline) represents the machine proper, which is to be hereinafter described in detail. 15, 16, and 17 are the binding-posts. S is a two-point switch contacting alternately with points 12 and 13, and EM is the electromagnet of the machine for controlling the switch S. The local wiring is variously indicated by the numerals 19 19, 20 20. The machine-circuit may be traced, commencing with contact 11, thence through LB', 15, S, 12, 19, EM, 17, 19, and 9 to 11, which circuit is normally closed. If the switch S be shifted to contact with point 13, then the local signal-circuit may be traced, commencing with point 13, thence through 16, 20, S$i$, LB', 15, and S to 13, which circuit is normally open. The operation of the key closing and opening the circuit of the main line and operating the relay closes and opens the sounder-circuit in the usual manner by the front contact of the relay and, inversely, opens and closes the machine-circuit by the back contact of the relay. The purpose of the machine is to throw the switch S to contact 13 upon the transmission over the main line of a combination of signals to which the machine is responsive in effecting the shifting of the switch. When such combination has been transmitted, the switch S contacts with 13, thereby opening the machine-circuit and closing the call-circuit and ringing the bell or lighting the lamp or doing any other thing which it may be desired to do and which a machine of this general nature may be capable of doing. The kind of calling or other device to be controlled by the switch may be determined by the circumstances of each installation. For instance, the ordinary electromagnetic bell may be used to sound an alarm. In large offices, where the bells would be annoying, miniature lamps may be used, and the devices may be located close to the relay, as on the desk or on the wall of the room or, at a distance, as at the operator's home.

In Fig. 23 I have shown the parts ML, K, R, 9, 10, 11, M, EM, S, 12, 13, S$i$, and LB as in Fig. 20. The machine is provided with four binding-posts 14 15' 16' 17'. The local sounder-circuit may be traced, commencing with front contact 10, thence through 18', S$o$, 14, 18', 12, S, 17', LB, and 9 to 10, which circuit is normally open. The local machine-circuit may be traced, commencing with back contact-point 11, thence through 19', 15', EM, 19', 12, S, 17', LB, and 9 to 11, which circuit is normally closed. The local signal-circuit may be traced, commencing with contact-point 13, thence through 16', S$i$, 20', LB, 17', S, to 13, which circuit is normally open. The operation of the key has the same effect in this arrangement of the circuits as in the arrangement shown in Fig. 20; but when the switch S is shifted from 12 to 13 to open the machine-circuit and close the call-circuit the local sounder-circuit is not affected in Fig. 20, while the local sounder-circuit is opened in Fig. 23.

The remaining figures of the drawings are designed to illustrate the mechanism whereby the switch S is shifted and whereby the switch is shifted at a certain station or group of stations and not at others. In these figures I have shown the machine provided with three binding-posts, so as to be included in the arrangement shown in Fig. 20; but it is plain that it may in this respect be modified to meet any condition or requirement.

B represents the base, ordinarily consisting of a suitable piece of hard wood, on which the machine proper is mounted, and A' (shown in Figs. 1 and 2 in section) is a suitable box inclosing the mechanism.

21 21 are the feet or pedestals on which the base may be supported.

Most of the parts of the machine are mounted between the upright plates or standards 23 23, which are supported on the base-plate 22 and held rigidly and suitably spaced apart by the three separators or stay-rods 24 24 24'. At one end of the base-plate is mounted a lug or standard 27 on a metallic plate 28', which is fastened to the base B by screws 29 29, one of which is connected by wire with the binding-post 15, connected with the battery of the machine and calling circuit, as indicated in the diagram. The switch S, which is a fine spring-wire, is secured to the lug 27 by the plate 28, screwed into the side of the lug 27. The contact-point 12 consists of a metallic pin mounted in insulation 30 in the lug 27, so as to be insulated from the switch S, and this point is connected by suitable wiring with the electromagnet EM, which in turn is connected with the binding-post 17 of the machine-circuit. The point 13 consists of a metallic pin in one end of a metallic lever 31, pivoted on a metallic shaft or spindle 32, pivoted in suitable bearing-screws 101 101 in the metallic frame, which is connected by suitable wiring from screw 57 to binding-post 16 of the signal or call circuit. Normally the switch S rests on the point or pin 12 and out of contact with the pin or point 13, thereby closing the machine-circuit and opening the call-circuit; but upon moving the outer end of the lever 31 upwardly the pin 13 engages the switch S and lifts it up off of the point or pin 12, thereby opening the machine-circuit and closing the call-circuit The inner arm of the lever 31 is provided with a laterally-extending pin 33, which rests normally on an upright pin 34, secured to a rock-shaft 35, which is also provided with a long controlling-rod 36 and a tail-rod 37, which serves as a weight to return the rock-shaft and its pin and rod to normal position. The lever 31 is so disposed that the inner arm overbalances the rear or outer arm. Consequently if the rod 36 be turned to the left, Fig. 1, to throw the pin 34 away from under the pin 33 the inner arm of the lever 31 will fall down on the shaft 35 and the outer arm will be elevated with the effect of shifting the switch, as described. To return the lever 31 to normal position after it has been shifted as above described, I employ an arm 38 on a rod 39, mounted in the opposite sides of the frame, the ends being bent to hold it in position, one of the ends being long enough to serve as a handle, and a tail-rod 40 resting normally on the lug 41' of the box A'. By turning the handle upward the arm 38 will depress the outer arm of the lever 31 and raise the inner arm, permitting the weight-arm 37 to carry the rock-shaft and its pin and rod to normal position and restoring the switch S to normal position. To throw the rod 36, I employ the devices hereinafter described.

On a shaft 41, pivoted between the frame-plates 23 23, are secured a ratchet-wheel 42, an arm 43, and one end of a light spiral spring 46, the other end of which is fastened to a post 47 in the adjacent plate 23. The ratchet-wheel has a pin 44, which engages a pin 45 in the adjacent plate 23 when the ratchet-wheel is in initial or normal position, as shown. The purpose of the pins is to stop the ratchet-wheel on its backward or return movement, it being understood that the wheel is actuated in its forward movement by the propelling devices hereinafter described and in its return movement by the spring 46. The rod 36 extends into the path of the arm 43, which is elbow-shaped, so that as the shaft 41 is actuated by the ratchet-wheel 42, and with it the arm 43, said arm at a certain point moves the rod 36 far enough to throw the pin 33 away from under the pin 34, thereby opening the machine-circuit and closing the call-circuit. As shown in these drawings, the arrangement is such that the wheel must be progressed twelve notches from its initial or normal position in order to throw the pin to shift the switch, as described.

On a shaft 60, also pivoted between the two frame-plates, is the main propelling or operating lever L, consisting of the vertical bar 62, to which is secured the armature-bar 63 and the horizontal rod 61, to the free end of which is pivoted the pawl 65, whose back motion is limited by a pin 65'. The parts 61 and 62 are rigidly secured together, this shape being preferred because of the compactness attainable in the arrangement of the electromagnets.

The two members of the electromagnet EM may be secured to the heel-plate 59 on the lug 49, which is fastened to the base-plate of the frame, and a buffer 64, which is also fastened to the base-plate, may be provided for the bar 62. This arrangement of the electromagnet and the armature and main propelling-lever is such that when the magnets are energized, as when the circuit is closed, the lever is held suspended and away from engagement with the other mechanism; but when the circuit is broken the rod 61 and pawl 65 fall of their own weight.

On a shaft 66', also pivoted between the uprights, is the balance-bar 66, which has at its forward end a laterally-projecting pin 80, normally resting on an upright trip-rod 81, (hereinafter to be explained,) and also on said shaft and connected with the bar 66 by the lug 67' is a bar 67, which has a single notch 68 and a shoulder 70, the face of the notch being slanting, so as to permit the shoulder to throw the pawl 65 out of said notch at the proper time, as hereinafter explained. Also secured on the shaft 66' is a block 71, in which is pivoted the propelling-pawl 74 and in which is secured the rest 72 for the pawl. The balance-bar and the parts secured thereto are so adjusted or balanced on the pivots that the long or inner arm slightly overbalances the other arm, so that its action will be comparatively slow.

Normally, the magnet being energized, the main operating-lever and the balance-bar are in the positions shown in Fig. 1. Upon the main circuit being closed and the machine-circuit being thereby opened, releasing the armature, the rod 61 falls of its own weight, and the pawl 65 engaging the notch 68 carries the rear arm of the balance-bar down with it, thereby raising the forward or inner arm. At a point shown by the dotted outline in Fig. 21 the shoulder 70 strikes the pawl 65 and throws it out of the notch 68, this being permitted by reason of the face 69 at about this point being about horizontal or sloping slightly to the rear. The main bar drops to the position shown in Fig. 9, being retarded somewhat in its fall by the rather sluggish action of the balance-bar, till it (the main lever) rests on the stay-rod 24'. The balance-bar is thrown against the buffer 25, which action has brought the propelling-pawl 74 into engagement with the teeth of the ratchet-wheel and progressed the wheel a distance of one tooth, whence the balance-bar will return to its normal position by its own weight, falling at first slowly and at last fast, and the main lever may be returned to its normal position by opening the main line and closing the machine-circuit, thus energizing the electromagnet, which draws to it the armature of the main lever. It is now plain that if this operation of closing and opening the main-line circuit be continued eleven more times the ratchet would be progressed twelve notches, thereby shifting the switch S, as described, in the absence of the operation of devices for throwing off the holding-pawl. As a holding-pawl for the ratchet-wheel I provide a shaft 75, pivoted between the frame-plates 23 23, and through said shaft I insert a stiff wire bent into proper shape to form the holding-pawl proper, 73, and the tail-rod 76, which latter tends to keep the former in constant engagement with the teeth of the ratchet-wheel.

I provide two means for throwing off the holding-pawl, so as to permit the spring to return the ratchet-wheel to normal or initial position. The first means is to be operated by hand and merely consists of the pin 77, extending laterally from the inner end of the lever 31 and engaging the under side of the tail-rod 76, so that as the inner arm of said lever is thrown upward in returning it to normal position by the rod 39 and arm 38 the pin 77 also throws up the tail-rod 76, thereby throwing off the holding-pawl and permitting the spring to return the ratchet-wheel. This means is to be employed after the station has been called and the operator at the called station restores the call apparatus to normal position ready for the next call. The second means is automatic and described as follows: Through the balance-bar 66 is secured a rod the upper end of which is bent over toward the ratchet-wheel to form a pin 79, (which need not be considered at present,) while the other end is extended downwardly and rearwardly to the holding-pawl 73, so that when the bar 66 is in normal positon, as shown in Fig. 1, the end of the rod 78 will not operatively engage the holding-pawl and so that when the balance-bar is permitted to fall to its extreme low position, as shown in Fig. 10, the lower end of the rod 78 will engage the holding-pawl and throw it away from the teeth of the ratchet, as shown in Fig. 10, thereby permitting the spring to restore the ratchet to its initial position.

To control the action of the balance-bar or automatic throw-off with relation to the holding-pawl, I employ a trip device preferably as follows: The supporting-rod 81 is secured to the shaft 82, pivoted between the frame-plates 23 23, which shaft also has a tail-rod 83 and a controlling-rod 84. The tail-rod is heavy enough to carry the shaft and other parts secured thereto to the position shown in Fig. 10, when both of the other rods are released, said tail-rod then resting on the lug 49. In this position the support 81 is carried out of the path of the pin 80, thus permitting the balance-bar 66 to fall until it rests on shaft 82, Fig. 10. The rod 85, pending from the main lever, engages with the controlling-rod 84 when the lever is in extreme low position, as shown in Fig. 9, but is free therefrom when the bar is in elevated or normal position, as shown in the other drawings. Thus the supporting-rod 81 is held in normal position either by the weight of the balance-bar, whose pin 80 rests in the slight depression at the top of said rod, or by the main lever, whose rod 85 engages the rod 84 when the main lever is in low position. The buffer 26 prevents the tripper from being thrown too far back.

The operation of the tripper is as follows: Assuming the parts to be in normal position, as shown in Fig. 1, if the machine-circuit be opened, permitting the main lever to fall, and thereby carry the forward arm of the balance-bar up, the tripper is first released from the pin 80 and then brought back to normal position by the rod 85, and if the circuit be left open until the balance-bar has fallen to normal position, with the pin 80 resting in the depression at the top of the support 81, the main lever may then be raised by closing the machine-circuit, by which operation the ratchet has been progressed one notch, as heretofore explained, and the holding-pawl has not been affected. If now instead of keeping the circuit through the electromagnet open for such a long period of time as is required for the operation just described the circuit be opened only momentarily by such action on the main line as is ordinarily intended for a dot, the main lever would fall only a very short distance, being retarded by engaging the balance-bar, and the balance-bar would not be thrown up to vertical position or far enough to progress the ratchet, but only far enough to barely raise the pin out of the depression or perhaps a little higher, which would release the tripper, which would be carried out of the path of the pin 80, as heretofore explained, and thus permit the balance-bar upon the immediate raising of the main lever by energizing the electromagnet to fall to its extreme low position, as shown in Fig. 10, thereby throwing off the holding-pawl 73 and permitting the spring to restore the ratchet to normal position—from all which it is evident that a dot or short impulse on the main line will restore the ratchet to normal position and that a long signal or a dash will progress the ratchet one notch. Although the machine may be adjusted so as to be operable by the ordinary dots and dashes of the Morse alphabet, yet I prefer in the form shown in the drawings to adjust the parts so that the dash required to progress the ratchet without throwing off the holding-pawl shall be somewhat longer than the dash of the ordinary Morse sending. The purpose is so that the ordinary Morse signals may be sent over the line without progressing the ratchet and ultimately without intention operating one of the machines.

All the shafts which are pivoted between the upright plates 23 23 are hung in suitable cup-bearing screws 101 101.

We now come to the means whereby the device may be rendered selective or individual, which consists principally of pins selectively arranged in the ratchet so as to render the trip device at times ineffective to throw off the holding-pawl, and here I may state that I am fully aware that in other machines pins have been arranged in the ratchet to operate as trip devices; but I am not aware that they have been employed in connection with the devices now to be described so as to operate not as trippers but rather as means for rendering another trip device ineffective. A pin 90 projects from the side of the ratchet-wheel and in the path of the pin 79, which extends from the balance-bar.

In Fig. 1 the pin 90 is shown as located opposite the fourth notch from the notch which is opposite the pin 79. In other words, the pin 90 is so located that when the ratchet has progressed four notches the balance-bar in returning from the extreme high position toward normal position after having progressed the ratchet the fourth successive time will fall with the pin 79 resting on the pin 90, thus holding the entire balance-bar, and especially the pin 80, above the tripping device, so that when the main lever is raised to normal position the tripper will fall to position shown in Fig. 12; yet the balance-bar will not throw off the holding-pawl, because it is sustained away from the trip device by reason of its pin 79 falling on the pin 90, as described, and if the next signal be a dot it is plain that such a dot will not have the effect of either progressing the ratchet or of returning it to normal position, and if the dot be followed by eight more dashes the call will be made. If, however, there be two machines on the same circuit, each connected up as herein set forth and provided with the mechanism herein described, except that the first machine has the pin at the fourth, as shown, and the ratchet of the second machine have no pin at all, it is quite evident that if in a succession of twelve dashes a dot be inserted between the fourth and fifth dashes the effect would be to return the second machine to initial position by the dot and call the first machine at the end of the twelfth dash, and it would also be clear that if the second machine had a pin at the fifth notch a succession of twelve dashes would call both machines, a succession of twelve dashes with a dot between the fourth and fifth dashes would call the first machine, and a succession of twelve dashes with a dot between the fifth and sixth dashes would call the second machine only. It is also clear that if a dot be made elsewhere than between the fourth and fifth or between the fifth and sixth dashes neither machine will be called.

In Figs. 16 to 19, inclusive, I have illustrated the arrangements of pins for four selective calling devices. It is to be understood that the machines at all stations are alike except as to the arrangements of these pins 90. In Fig. 16 pins are located at the fifth and seventh notches, in Fig. 17 at the fifth and sixth notches, in Fig. 18 at the fourth and seventh notches, and in Fig. 19 at the fourth and sixth notches. The relative arrangements of the pins on the several ratchets may be tabulated as follows, the first horizontal line indicating the figure of the drawing and the first column on the left indicating the number of the notch, "N" indicating that there is not and "P" indicating that there is a pin opposite the designated notch of the designated ratchet:

|    | 16 | 17 | 18 | 19 |
|----|----|----|----|----|
| 1  | N  | N  | N  | N  |
| 2  | N  | N  | N  | N  |
| 3  | N  | N  | N  | N  |
| 4  | N  | N  | P  | P  |
| 5  | P  | P  | N  | N  |
| 6  | N  | P  | N  | P  |
| 7  | P  | N  | P  | N  |
| 8  | N  | N  | N  | N  |
| 9  | N  | N  | N  | N  |
| 10 | N  | N  | N  | N  |
| 11 | N  | N  | N  | N  |
| 12 | N  | N  | N  | N  |

From these drawings and from the foregoing table it will be readily understood that the stations may be called altogether simultaneously, in groups, or individually according to the following code of signals:

| Station or stations called. | Combination. |
|---|---|
| 16 | 5 dashes, dot, 2 dashes, dot, 5 dashes. |
| 17 | 5 dashes, dot, 1 dash, dot, 6 dashes. |
| 18 | 4 dashes, dot, 3 dashes, dot, 5 dashes. |
| 19 | 4 dashes, dot, 2 dashes, dot, 6 dashes. |
| 16 and 17 | 5 dashes, dot, 7 dashes. |
| 16 and 18 | 7 dashes, dot, 5 dashes. |
| 17 and 19 | 6 dashes, dot, 6 dashes. |
| 18 and 19 | 4 dashes, dot, 8 dashes. |
| All stations | 12 dashes. |

The purpose of the four preliminary notches without pins is that in ordinary telegraphing a slow operator might make a number of long dashes without the intention of calling; but he is not liable to make as many as four such successively, and therefore as the dots so frequently intervene the dashes in ordinary Morse and as even the Morse dashes are intended to have the effect of throwing off the holding-pawls all the instruments are ordinarily kept in about normal position. Of course if the devices are to be used on a party-line telephone system the necessity of the preliminary notches will not exist. Hence the use of four as an exact number is arbitrary and may be altered to suit any condition or dispensed with. The purpose in having the twelve notches to close the call-circuit is that with this number I am enabled to place sixteen stations on a single line with the four preliminary "safety-notches" without pins, so that each station may be called individually and so that all may be called simultaneously and so that they may be called in various groups, all at the will of the calling operator, as indicated by the following table, in which the plan of the above table is followed:

| No. of notch. | Station. |||||||||||||||| |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 1  | N | N | N | N | N | N | N | N | N | N | N | N | N | N | N | N |
| 2  | N | N | N | N | N | N | N | N | N | N | N | N | N | N | N | N |
| 3  | N | N | N | N | N | N | N | N | N | N | N | N | N | N | N | N |
| 4  | N | N | N | N | N | N | N | N | N | P | P | P | P | P | P | P |
| 5  | P | P | P | P | P | P | P | P | N | N | N | N | N | N | N | N |
| 6  | N | N | N | N | P | P | P | P | P | P | P | P | N | N | N | N |
| 7  | P | P | N | N | N | N | P | P | P | P | N | N | N | N | P | P |
| 8  | N | N | P | P | N | N | P | P | N | N | P | P | N | N | P | P |
| 9  | P | N | P | N | P | N | P | N | P | N | P | N | P | N | P | N |
| 10 | N | P | N | P | N | P | N | P | N | P | N | P | N | P | N | P |
| 11 | P | N | P | N | P | N | P | N | P | N | P | N | P | N | P | N |
| 12 | N | N | N | N | N | N | N | N | N | N | N | N | N | N | N | N |

The combination necessary to call individually any particular station may be readily ascertained by taking the column under that station, substituting a dash for each letter, (both for the "P's" and for the "N's,") and then inserting a dot after each dash which is substituted for the "P's." All the stations will be called by making the twelve successive dashes with no intervening dots, and the stations may be called in groups by arranging them as above explained. Of course this arrangement is an ideal one, and there is probably no instance where this exact arrangement might be applicable; but it serves perhaps better to illustrate the principles of my invention than a more practical division or grouping and will aid any one in installing a system in arranging the pins and combinations. If more stations are to be included in the line, the number may be increased to thirty-two by using fourteen notches and to sixty-four by using sixteen notches, and so on. By adding two more notches before the call-circuit will be closed the number of stations may be doubled.

In Figs. 21 and 22 the propelling-pawl is pivoted directly on the main propelling-lever instead of on the balance-bar. This pawl is here shown as 92, which really does the same thing as the pawl 74. The stop-pins 93 and 94 above and below the pawl limit its motion. In this form the main lever should be bent over to one side of the wheel, as at 91, to bring the pawl 92 into engagement with the ratchet-wheel, and the order of the parts of the balance-bar and the trip should be modified accordingly, as clearly shown in Figs. 21 and 22. The parts are so adjusted that the pawl 92 engages the tooth of the ratchet just as the pawl 65 is thrown from the notch 68, as indicated by the dotted outline in Fig. 21, which allows the full weight of the main lever to fall on the ratchet-wheel, so as to progress it one notch.

From the foregoing description it is now apparent that when my invention is embodied in the form shown in the drawings and connected up as therein set forth, so as to be controlled by the back contact of the relay, the dots and dashes necessary to operate the machine are the dots and dashes produced by the direct stroke or action of the transmitting-key as distinguished from the back stroke or action thereof, as heretofore explained.

It is also now clear that when the machine-circuit is closed, as in normal condition, the main operating-lever is held suspended by the electromagnet away from the ratchet and that upon opening the machine-circuit by closing the main-line circuit the main lever is simply permitted to fall by the force of gravity, which causes the propelling of the entire machine. Whereas in former machines of this nature the electromagnet has had the effect when energized of either drawing or permitting or causing the propelling-lever to fall to the ratchet, in any of which cases the electromagnet has had to draw against the tension of a retractile spring, in my machine I use only the two forces of the electromagnet and of gravity, eliminating the spring.

Another important element of my invention is that whereas in former machines any and all actions of the machine have the effect of progressing the ratchet one or more notches in my machine it is only the dashes that progress it, and the dots either do not progress it or return it to normal.

The features stated in the last two paragraphs are of importance because of the fact that a weak current will operate the machine, while a stronger current would be required to draw the main lever or the armature controlling it against the tension of a retractile spring and to progress the ratchet each time that either a dot or a dash was made on the main line. Also by using a trip device for the holding-pawl throw-off, controlled by the main lever, and using the pins on the ratchet for rendering the trip device at times ineffective instead of using the pins themselves as the trip devices, it is to be seen that the number of pins necessary in a series of the machines on the same line will be lessened, and it is also now understood that the number of stations which may be placed on a single line is therefore practically limitless, with comparatively small ratchets, so far as the number and arrangements of the pins are concerned. Also by the arrangements shown in my invention I am enabled to include a station in a group or call it individually or with all the other stations at will—a feature not possible with other machines.

Another principle involved in my invention is this: In ordinary telegraphing by the make-and-break method I have found that the total length of the spaces considerably exceeds the total length of the dots and dashes—that is, that the main line is open more than it is closed, and consequently the armature of the relay engages more with the back contact than with the front contact, thus keeping the machine-circuit, which is controlled by the back contact, closed a majority of the time. In former machines using the electromagnet and main propelling-lever and controlled by the back contact of the relay the bar has been engaged with the ratchet, while the local machine-circuit has been closed and disengaged therefrom, while the local machine-circuit has been open, while in my machine the operation is reversed. Therefore in former machine, as the machine-circuit is closed more than it is open, the sending of the usual Morse signals over the line will keep the main lever in engagement with the ratchet more than disengaged therefrom, while in my machine the lever is kept away from the ratchet more than in engagement therewith. The results are, in connection with the mechanism employed in my machine, that whereas in former machine the ratchets have been continuously progressed and returned by both dots and dashes in my machine the dots do not progress the machine-ratchet and even the dashes of the Morse signal may return the ratchets, and consequently the ratchets are retained all the time in approximately normal position. This is a matter of considerable importance in view of the fact that the machine is affected by every dot and dash sent over the line.

What I claim is—

1. The combination with the relay and the local sounder-circuit including a battery and a sounder controlled by the front contact of the relay; of the selective-call machine-circuit controlled by the back contact of the relay and including another battery and an electromagnet; a signal-circuit including a signal device and the second-named battery; and the two-point switch selectively operable by the electromagnet for opening the machine-circuit and closing the signal-circuit.

2. The combination of the relay and the local sounder-circuit including the battery and the sounder controlled by the front contact of the relay; the selective-call machine-circuit including another battery and an electromagnet; a signal-circuit including a signal device and the second-named battery; a two-point switch for opening the machine-circuit and closing the signal-circuit; a switch-operating lever; a ratchet to operate said lever and propelling and holding pawls for the ratchet; the main propelling-lever controlled by the electromagnet and adapted to actuate the propelling-pawl; a balance-bar actuated by the main lever and actuating the holding-pawl; a trip device controlled by the main lever for controlling the action of the balance-bar with relation to the holding-pawl; and pins selectively arranged in the ratchet for rendering the trip device ineffective.

3. The combination of the circuit including the battery and the electromagnet; the circuit including the signal device and said battery; the two-point switch for opening the first-mentioned circuit and closing the signal-circuit; a switch-operating lever; a ratchet to operate said lever and propelling and holding pawls for the ratchet; the main propelling-lever controlled by the electromagnet; a balance-bar actuated by the main lever and actuating the holding-pawl; a trip device controlled by the main lever for controlling the action of the balance-bar with relation to the holding-pawl; and pins selectively arranged in the ratchet for rendering the trip device at times ineffective.

4. The combination of the switch-shifting ratchet and the propelling and holding pawls therefor; the circuit including a battery and an electromagnet; the propelling-lever controlled by the electromagnet; together with suitable mechanism whereby a long stroke of the lever will progress the ratchet without throwing off the holding-pawl, and a short stroke will throw off the holding-pawl without progressing the ratchet.

5. The combination of the circuit including a battery and an electromagnet; a switch-shifting ratchet and means tending to force it to initial position and propelling and holding pawls therefor; the main lever controlled by the electromagnet to actuate the balance-bar and to control its action with relation to the holding-pawl; the balance-bar to actuate the holding-pawl; and the pins selectively arranged in the ratchet and engaging the balance-bar to render the control of the main bar over the balance-bar as to the holding-pawl ineffective.

6. The combination with the circuit including a battery and an electromagnet; of the ratchet; the balance-bar; the main propelling-lever controlled by the electromagnet; the propelling-pawl actuated by the main lever; the holding-pawl; and a trip-support for the balance-bar adapted in one position to sustain the bar away from the holding-pawl, and in another position to permit the bar to throw off the holding-pawl.

7. The combination of the circuit including a battery and an electromagnet; the ratchet and propelling and holding pawls therefor; the main propelling-lever controlled by the electromagnet; the balance-bar operated by the main lever and adapted at times to throw off the holding-pawl; the tripping device controlled by the main lever to control the action of the balance-bar with relation to the holding-pawl.

8. The combination with the electric circuit including a battery and an electromagnet; of the ratchet and the propelling and holding pawls therefor; the main propelling-lever controlled by the electromagnet and controlling the propelling-pawl; the balance-bar operated by the main lever and adapted at times to throw off the holding-pawl; and the trip device to control the action of the balance-bar with relation to the holding-pawl.

9. The combination with the circuit including a battery and an electromagnet; of the main propelling-lever controlled thereby; a switch-operating ratchet and propelling and holding pawls therefor adapted to be operated by the main lever; the balance-bar operable by the main lever and adapted to engage the holding-pawl; a trip device controlled by the main lever and adapted in one position to keep the bar free from the holding-pawl, and in another position to engage said pawl by said bar to throw off said pawl; and means selectively arranged for rendering said trip device ineffective for engaging said pawl to throw it off.

10. The combination of the circuit including a battery and an electromagnet; a switch-shifting ratchet and propelling and holding pawls therefor; a main propelling-lever and a balance-bar, operable by the electromagnet and operating the pawls; a trip device controlled by the main lever and adapted to control the action of the balance-bar with relation to the holding-pawl; and devices selectively arranged to render the trip device ineffective.

11. The combination of the main lever; the ratchet and holding and propelling pawls therefor; the balance-bar between the main lever and the pawls; the trip device controlled by the main lever for controlling the action of the balance-bar with relation to the holding-pawl; and the pins selectively arranged in the ratchet to render the trip device at times ineffective.

12. The combination of the circuit including the battery and the electromagnet; a switch-operating ratchet and propelling and holding pawls therefor; a main propelling-lever controlled by the electromagnet; a balance-bar actuated by the main lever and actuating the pawls; a trip device controlled by the main lever for controlling the action of the balance-bar with relation to the holding-pawl; and pins selectively arranged in the ratchet for rendering said trip device ineffective.

13. The combination of the main propelling-lever; the ratchet and propelling and holding pawls therefor; the balance-bar actuated by the main lever and itself actuating at times the holding-pawl; the trip device controlled by the main lever to control the action of the balance-bar with relation to the holding-pawl; and pins selectively arranged in the ratchet for rendering the trip device ineffective.

14. The combination of the circuit including a battery and an electromagnet; the main propelling-lever having the pawl 65; the balance-bar having the notch and the shoulder to engage the pawl and to throw it and free the bar from the main lever and permit the independent return of the bar.

15. The combination of the main propelling-lever and the balance-bar held normally in an approximately horizontal position, but being adapted to be thrown by the main lever to approximately vertical position and to be returned by the force of gravity and independently of the return of the main lever.

16. The combination of the ratchet and propelling and holding pawls therefor; the balance-bar to throw off the holding-pawl; a trip device to control the action of the balance-bar with relation to the holding-pawl; actuating mechanism for the bar, the propelling-pawl, and the trip device; and pins selectively arranged in the ratchet to render the trip device at times ineffective.

17. The combination of the main propelling-lever; the ratchet with propelling and holding pawls therefor; the balance-bar between the main lever and the holding-pawl; the trip device controlled by the main lever for controlling the action of the balance-bar with relation to the holding-pawl; and the devices selectively arranged to render said trip device at times ineffective and to prevent the balance-bar from throwing off the holding-pawl.

18. The combination of the switch-shifting ratchet and holding and propelling pawls therefor; devices for actuating the pawls; a trip device for controlling the action of the holding-pawl-actuating device with relation to said pawl; and pins selectively arranged in the ratchet to render the trip device at times ineffective.

19. The combination of the switch-shifting ratchet and the propelling and holding pawls therefor; devices for operating the propelling-pawl, and also for throwing off the holding-pawl without progressing the ratchet; a trip device for controlling the holding-pawl throw-off; and devices selectively arranged to render the trip device ineffective.

20. The combination of the ratchet and the operating devices and a holding-pawl therefor, said pawl having a tail-rod; a switch; a switch-operating lever having two pins extending laterally therefrom to engage, respectively, the said tail-rod and a supporting-pin; a rock-shaft having a tail-rod, a supporting-pin, and a controlling-rod engaged by the ratchet.

21. The combination of the ratchet and operating devices and a holding-pawl therefor; a switch; a switch-operating lever and a support therefor; the ratchet being adapted to throw the support to permit the lever to shift the switch.

22. The combination of the switch; the ratchet and propelling devices and a holding-pawl therefor; the switch-controlling lever intermediate the ratchet and the switch, and adapted to restore the switch and throw off the holding-pawl simultaneously.

23. The combination of the switch; the switch-shifting ratchet and propelling and holding pawls therefor; the devices for automatically restoring the ratchet to initial position; and the devices for manually restoring the switch and the ratchet to initial positions simultaneously.

24. The combination of the ratchet with propelling devices and a holding-pawl therefor; a throw-off for the holding-pawl; a trip device for the throw-off; and pins selectively arranged in the ratchet to sustain the throw-off free from the trip device and thus to render the trip device at times ineffective.

25. The combination of a series of ratchets, propelling devices and holding-pawls therefor; a throw-off for each holding-pawl; a trip device for each throw-off; and pins selectively arranged in each ratchet for sustaining the throw-off free from the trip device to render the trip device at times ineffective; whereby the simultaneous operation of all the trip devices may throw off some of the holding-pawls and not affect the others.

26. The combination of the main propelling-lever, the balance-bar, and the ratchet; the main lever being adapted to engage with the balance-bar in its action toward the ratchet so as to be retarded thereby, before propelling the ratchet.

27. The combination of the main propelling-lever, the balance-bar, and the ratchet; the main lever being adapted to engage initially with the balance-bar in its propelling stroke.

28. The combination with the relay of the main telegraph-circuit and the circuit controlled by the back contact thereof and including a battery; of the device comprising the switch-shifting ratchet and push and retaining pawls therefor, a propelling-lever to actuate the push-pawl, and an electromagnet to actuate the propelling-lever and included in the second-named circuit; said switch-shifting device being selectively operated by the dots and dashes produced by the direct action of the telegraph-transmitter as set forth.

29. The combination of the relay and the circuit controlled by the back contact thereof and including a battery and an electromagnet; a signal-circuit including a battery, a signal device, and a switch; a ratchet for controlling the switch; and a balance-bar and a main propelling-lever controlled and actuated by the electromagnet, said lever being actuated in one direction by gravity and in the other by the energized electromagnet.

30. The combination of the main propelling-lever; the ratchet and propelling and holding pawls therefor; the pivoted oscillating balance-bar intermediate the main lever and the propelling-pawl actuated in one direction to propel the ratchet by the main lever and returnable by gravity independently of the return of the main lever.

31. The combination of the circuit including a battery and an electromagnet; a main propelling-lever controlled by the electromagnet; a switch-shifting ratchet; a balance-bar intermediate the main lever and the holding-pawl and acting as a throw-off for the holding-pawl; the push and holding pawls; and the devices selectively arranged to prevent the balance-bar at times from throwing off the holding-pawl.

32. In a system of electric selective calls of the kind described, a series of ratchets with propelling and retracting devices therefor and suitable means whereby a certain signal will progress all the ratchets and another certain signal will retract them; together with devices selectively arranged for each ratchet for preventing, at selected times, the retraction of that ratchet notwithstanding the operation of the second-named signal.

33. The combination of the circuit including a battery and an electromagnet; a switch-shifting ratchet and the propelling and holding pawls therefor; the balance-bar to actuate the holding-pawl; the main propelling-lever controlled by the electromagnet to actuate the balance-bar and to control its action with relation to the holding-pawl; and the devices coöperating with the ratchet and selectively arranged to prevent the balance-bar from throwing off the holding-pawl notwithstanding the action of the main lever normally having that effect.

34. The combination of the ratchet and propelling and holding pawls therefor; the balance-bar to throw off the holding-pawl; a trip device to control the action of the balance-bar with relation to the holding-pawl; actuating mechanism for the bar and the propelling-pawl; and devices selectively arranged in the ratchet to render the trip device at times ineffective.

35. The combination of a series of ratchets, propelling devices and holding-pawls therefor; throw-offs for the holding-pawls means for operating all the throw-offs in concert; and selective devices for each ratchet for rendering the operation of said throw-offs at times ineffective.

36. The combination of a series of ratchets and propelling devices and holding-pawls therefor; a throw-off for each holding-pawl; means for normally operating all of the throw-offs in concert; and devices selectively arranged for each ratchet for preventing the throwing off of the holding-pawl.

37. The combination of a series of ratchets and propelling devices and holding-pawls therefor; means for progressing all the ratchets in concert by one certain signal, and for retracting them by another certain signal; and devices coöperating with each ratchet and selectively arranged for preventing the retraction of the said ratchet notwithstanding the said second-named signal.

38. In a system of electric selective calls of the kind described, the series of switch-shifting ratchets, the propelling devices and holding-pawls, therefor, together with suitable mechanism whereby a certain signal will progress all the ratchets, and another certain signal will normally return them, and devices selectively arranged for each ratchet for preventing the return of that ratchet notwithstanding the operation of the return-signal; in which construction each station may be called individually and in concert with others, and in which a succession of the ratchet-progressing signals, without the ratchet-returning signals, will call all the stations.

39. In a system of electric selective calls of the kind described, a series of ratchets with propelling devices and holding-pawls therefor and a throw-off for each holding-pawl; mechanism whereby a certain signal will progress all the ratchets and another certain signal will normally throw off the holding-pawls and return all ratchets to initial positions; and devices selectively arranged for each ratchet for preventing the return of the ratchet notwithstanding the operation of the throwing-off signal; whereby the several stations may be called individually and in groups at the will of the calling operator.

In testimony whereof I have hereunto set my hand in the presence of two witnesses.

JOHN A. HULIT.

Witnesses:
   I. L. BETZER,
   SIDNEY SMITH.